US007299543B2

(12) United States Patent
Montena

(10) Patent No.: US 7,299,543 B2
(45) **Date of Patent: *Nov. 27, 2007**

(54) MULTIPLE CONNECTOR COMPRESSION TOOL

(75) Inventor: Noah P. Montena, Syracuse, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/302,478

(22) Filed: Dec. 13, 2005

(65) Prior Publication Data

US 2007/0130758 A1 Jun. 14, 2007

(51) Int. Cl.
*B23P 19/00* (2006.01)

(52) U.S. Cl. ............................ 29/751; 29/748; 29/750

(58) Field of Classification Search .................. 29/748, 29/749, 750, 751, 752, 753
See application file for complete search history.

(56) References Cited

U.S. PATENT DOCUMENTS 3,365,927 A * 1/1968 Lynch ......................... 72/416
6,227,030 B1 * 5/2001 Lefavour et al. ............. 72/416

* cited by examiner

*Primary Examiner*—Carl J. Arbes
(74) *Attorney, Agent, or Firm*—Schmeiser, Olsen & Watts

(57) ABSTRACT

A multiple connector compression tool for use with multiple sized connectors and a cable is disclosed. The tool is designed to receive at least two different connector configurations. The tool does not require using adaptors which may be lost or misplaced. The tool has a long life because there are very few wear items while maintaining the ability to produce different connectors.

17 Claims, 6 Drawing Sheets

MULTIPLE CONNECTOR COMPRESSION TOOL

CROSS-REFERENCE TO RELATED APPLICATIONS

This application is related to Ser. No. 11/301,896, entitled Multiple Connector Compression Tool and Method, filed on Dec. 13, 2005 and is hereby incorporated by reference.

FIELD OF INVENTION

The present invention relates to compression tools for attaching connectors onto wires, cables and the like. More particularly, the present invention relates to a compression tool for use with multiple sized connectors and related method of affixing a connector to a cable or wire.

BACKGROUND

The electronics, telecommunications, and cable television industries have used a variety of cables and wires to perform various jobs. Each cable or wire has various size and shaped connectors based upon either an industry standard or in some cases a proprietary manufacturing standard. The industry has used compression tools to attach various size and types of connectors onto wires. The norm has been to use a compression tool having a universal compression head and then attaching an appropriate adapter to attach a connector of a specific length, diameter or other dimension.

This type of compression tool with an adjustable adapter to vary connector size is compact because it is designed to fit only one connector at a time. This is great for ease of handling and storage. Initially, in the early stages of a universal compression tool's life span the tool works as intended, but there are many drawbacks as the tool ages. One drawback is that the adapters can be lost or damaged. Another drawback is that depending on the design the additional moving parts create wear, looseness of the insert and eventual failure of the compression tool. The instant invention addresses the abovementioned drawbacks of the universal connector compression tool.

SUMMARY OF THE INVENTION

A connector compression tool that has provisions for producing at least two different connectors permanently designed into the head to avoid the deficiencies of adapters in the form of looseness, wear and loss of adapters. The tool contains at least two or more compression channels to fit the desired connectors permanently designed into the body of the tool to avoid the prior tool deficiencies.

One embodiment is a multiple connector compression tool for use with multiple sized connectors and a cable, said compression tool comprising a body having an upper portion, a lower portion, a first side and a second side; an actuator, wherein the actuator is movably attached to the upper portion of the body; a first compression chamber that is operatively coupled and positioned proximate to the actuator, and configured for receiving a first cable connector of a first dimension; a second compression chamber that is operatively coupled and positioned distal to the actuator, and configured for receiving a second cable connector of a second dimension, said second cable connector being a different dimension than the first cable connector; and a first cable receiving portion, operably associated with the first compression chamber, wherein when a coaxial cable is positioned in the first cable receiving portion, a connector of a first dimension may be compressed thereon by force from the actuator; and a second cable receiving portion, operably associated with the second compression chamber, wherein when a coaxial cable is positioned in the second cable receiving portion, a connector of a first dimension may be compressed thereon by force from the actuator.

In another embodiment a multiple connector size compression tool comprises a body having a top, a bottom, a first side and a second side each side having a guidance portion therein; a handle, wherein the handle is pivotally attached to the body between the first side and the second side; a transfer element; a sliding head having a protruding component, wherein the protruding component of the sliding head is both retained and movable within the guidance portion of the body and the transfer element transmits force from the handle to the sliding head; an upper compression channel portion configured to receive a connector of a first dimension; a lower compression channel portion configured to receive a connector of a second dimension different than the first dimension; and a cable cradle having an upper cable receiving portion and a lower cable receiving portion, wherein the cradle is affixed to the body between the first side and the second side.

Another aspect of the present invention is a method of affixing a cable connector to a wire comprising: providing a body having a top, a handle attached to the top of the body, a sliding head having a protruding component that is slidably affixed to the body and operably coupled to the handle, a upper compression portion of the sliding head for receiving a connector of a first dimension, a lower compression portion of the sliding head for receiving a connector of a second dimension larger than the first dimension, and a cable cradle affixed to the body; providing a cable connector; providing a wire; inserting the cable connector and the wire onto an appropriately sized driver tip in the body; moving the sliding head to drive the cable connector onto the wire forming a connector cable; and, removing the connector cable from the body.

DESCRIPTION OF DRAWINGS

The following figures displays one possible manifestation of the claimed invention, one skilled in the art could modify the invention as claimed into many equivalent forms having similar functions and elements, but having a different shape or form.

DETAILED DESCRIPTION OF THE INVENTION

Figure 1:
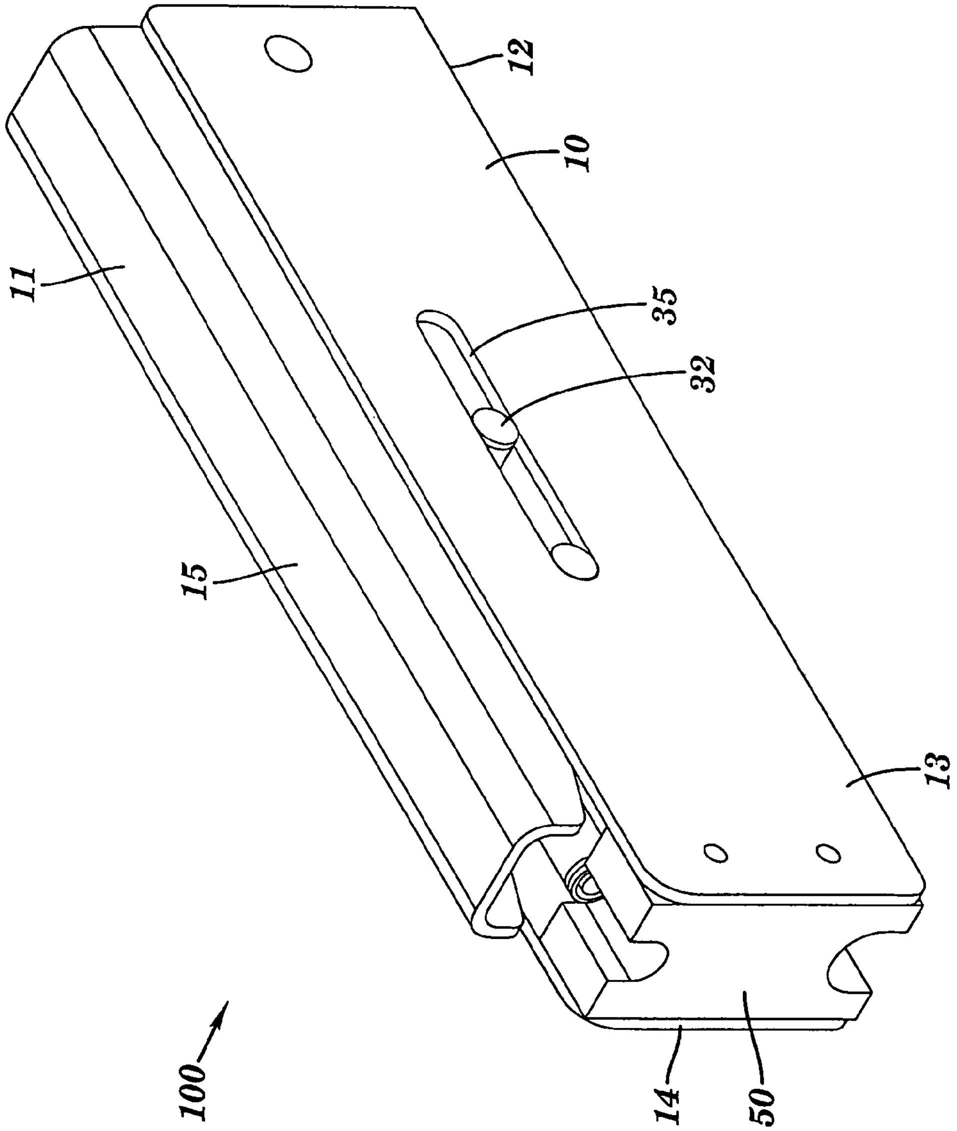
FIG. 1 displays a top perspective view of the first end of the tool.
Figure 2:
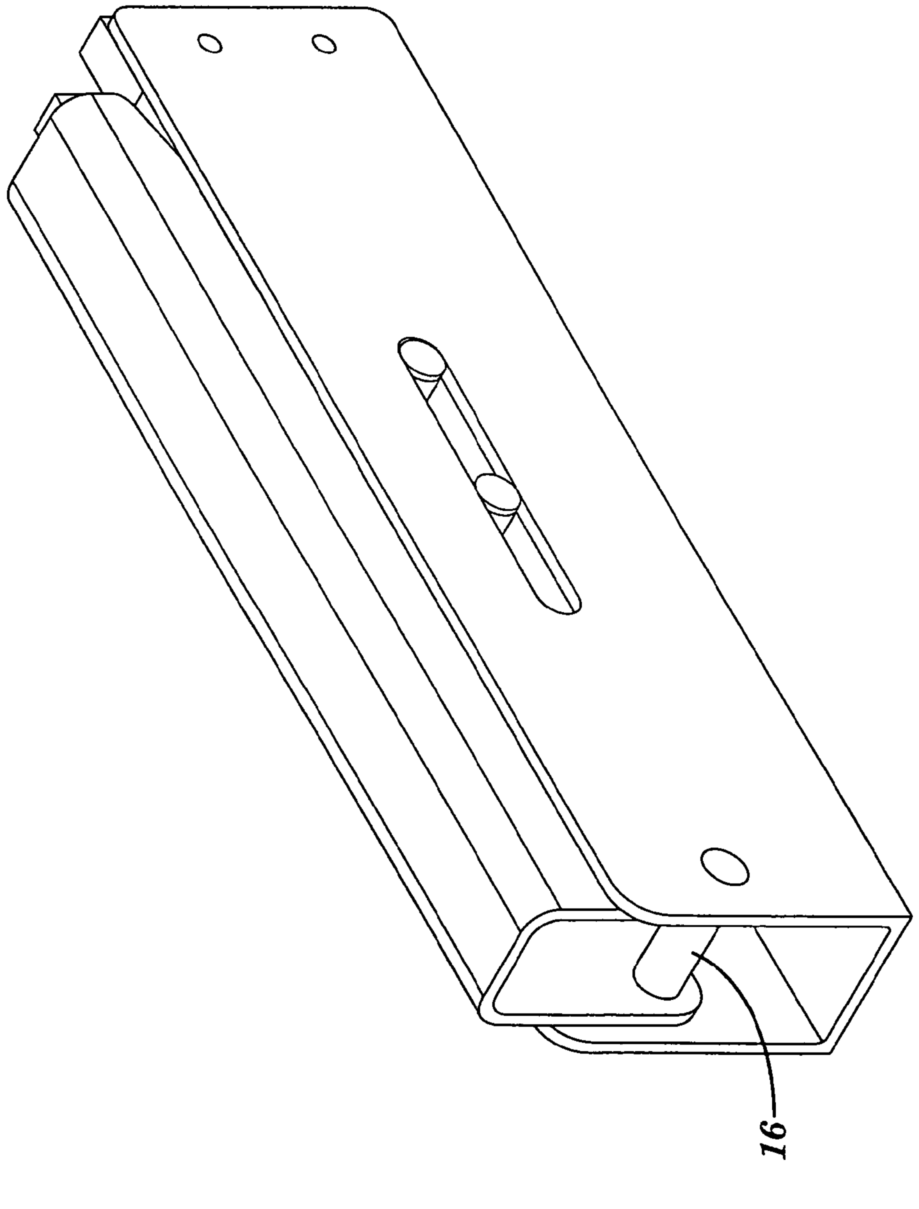
FIG. 2 displays a cross-sectional side perspective view of the tool.

A multiple connector size compression tool 100 for at least two or more different sized or types of connectors is shown in FIGS. 1-6 that may comprise a body 10 having an upper portion 11, a lower portion 12, a first side 13 and a second side 14. The compression tool 100 can be used while handheld or while resting on a surface, such as a table. The compression tool 10 has vertically offset connectors 11, 12 within the body 100. Alternatively, the connectors 11, 12 may be referred to as adapters, couplers, or fastener members or devices. The configuration for receiving the connectors 11, 12 is permanently designed into the compression mechanism of the tool 100 to prevent the previous deficiencies such as looseness or misplacement of the adapters to fit various sizes. This allows for a simple tool with adaptability for multiple connectors without the problems associated with a unit designed for all possible connectors.

Attached to the body 10 may be an actuator, lever or handle 15 (see FIGS. 1-6), wherein the handle 15 is movably attached 16 to the upper portion 11 of the body 10. The downward movement of the handle 15 moves or linearly translates a sliding head 25, wherein the head may be movably affixed 30 to the body 10 between either the first side 13 and/or the second side 14 of the body 10 and configured to be operatively coupled to the handle 15. The handle 15 moves the sliding head 25 so that the force of moving the handle 15 against the body 10 may cause the sliding head 25 to translate within the interior of the body 10 from a first uncompressed position to a second compressed position. The sliding head 25 may also be advanced with a transfer element device 70 such as hydraulics, electronics or a mechanical advantage device such as a gear, screw, lever or handle to move the sliding head 25 with sufficient force to compress the connector onto the wire. The lever or handle 15 may have a material used for a grip or other ergonomic design (not shown) for ease of handling and comfort of the user. The lever or handle 15 may be movably attached to the sides or walls 13, 14 of the body 100 by any of a number of devices such as a bar, catch, coupling, dowel, fastener, key, lag, latch, peg, pin, rivet, rod, screw, skewer, sliding bar, spike, staple, or stud. The body 10 could be any rigid material such as metal, composites, polymers or plastic that will not torsionally flex during the compression process. The body 10, may be stamped, cut, shaped, finished, machined, forged, cold worked, heat treated or assembled with conventional fasteners, such as stamps, welds, adhesive, rivets, pins, screws, nails and the like. If made of a plastic, polymer or composite the body may be molded and either adhered or glued, welded or mechanically or chemically fastened together. The tool is not limited to any specific material as long as it is sufficiently stiff to prevent flexing or breaking of the body 10 for a period of time to permit a useful life of the tool. A first cable connector 101 and a second cable connector 102 are shown within the compression tool 100.

Figure 4:
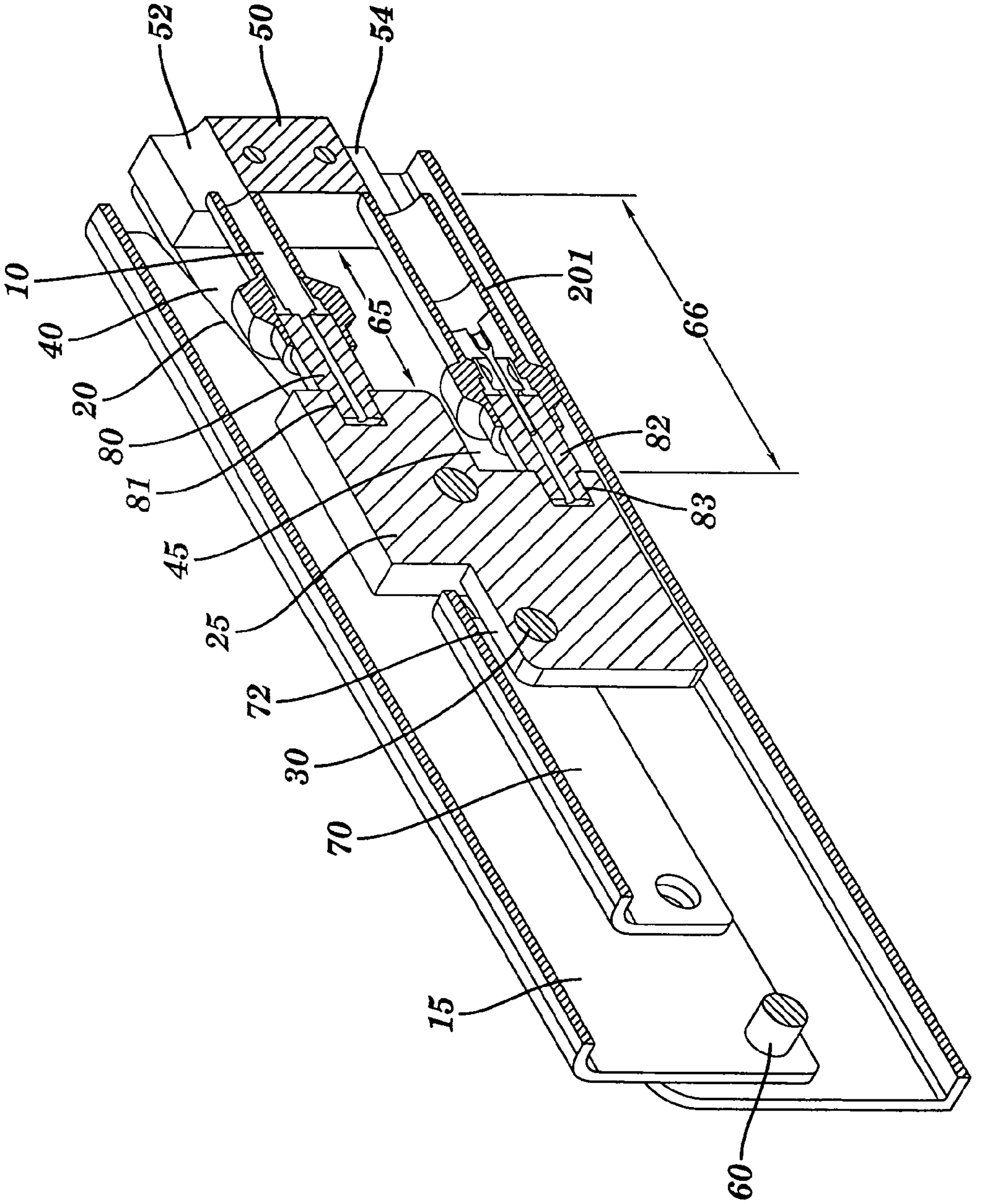
FIG. 4 displays a top perspective view of the second end of the tool.
Figure 5:
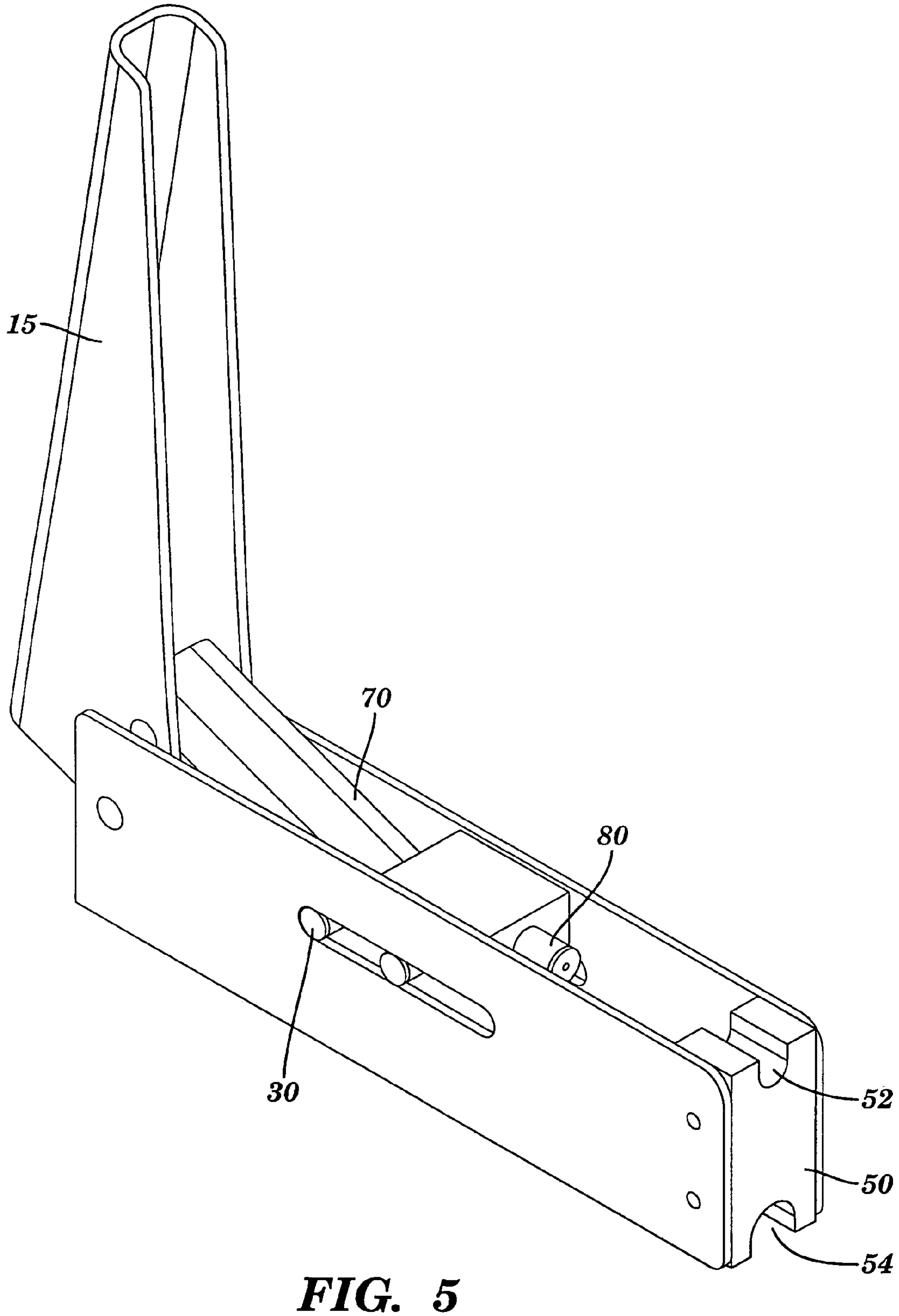
FIG. 5 displays a top perspective view of the second end of the tool with the handle raised.
Figure 6:
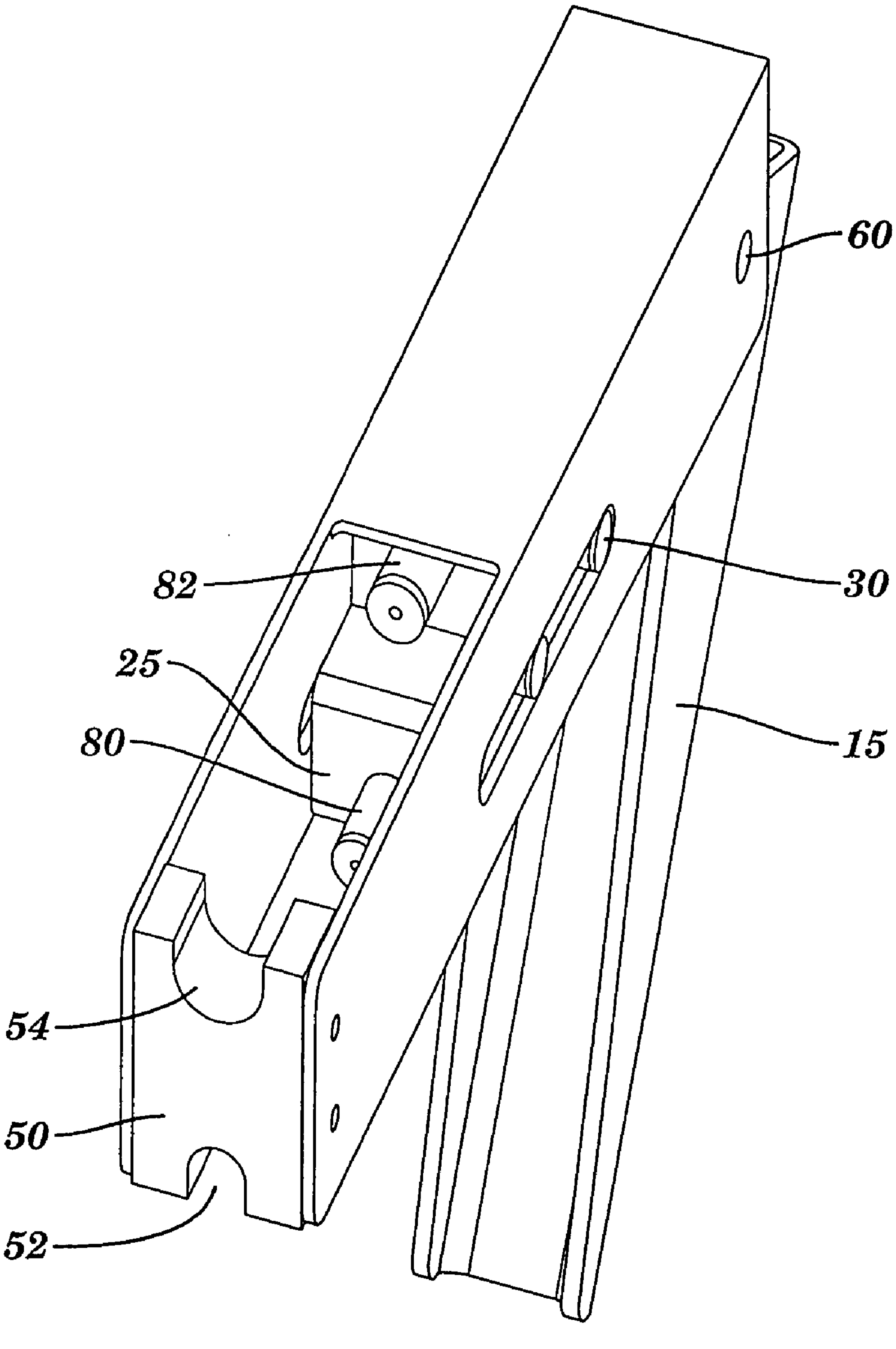
FIG. 6 displays a top perspective view of the first end of the tool with the handle raised.

FIG. 4 displays the upper compression chamber portion 40 that may be adjacent to the actuator or handle 15. The upper or first compression chamber 40 may be configured for receiving a connector of a first dimension 101. The lower or second compression chamber 45 is adjacent to the bottom 12 of the body 10 for receiving a connector of a second dimension 102 different than the first dimension 101. The tool may be opened by raising the handle and retracting the sliding head 25 a sufficient distance to expand the compression chamber 40, 45 so that at least one connector and a wire or cable can be inserted uncompressed into the connector within one of the compression chambers 40, 45. The first and second dimensions can be the same or any two different sized connectors that are defined, at least in part, by the shape and dimensions of the sliding head 25. The compression chambers 40, 45 are formed by the space created between the body 10 and the sliding head 25. The compression chambers 40, 45 may be fully compressed when the handle 15 is substantially flushed with the body 10 or at the end of its travel. The compression chamber volume is dependent on the specific type of connector and largely controlled by the shape and end position of the sliding head 25 or the body 10.

FIGS. 1, 3 and 4-6 show a cable cradle 50 having an upper cable receiving portion 52 and a lower cable receiving portion 54, wherein the cable cradle 50 may be affixed to the body 10. The cable cradle 50 may help to align and hold the cable during the process of attaching the cable connector end onto the wire. The cable cradle 50 may also serve to receive the end of a connector and the cradle 50 remains stationary during the compression process so that the connector is compressed onto the cable from the movement of the sliding head 25.

Figure 3:
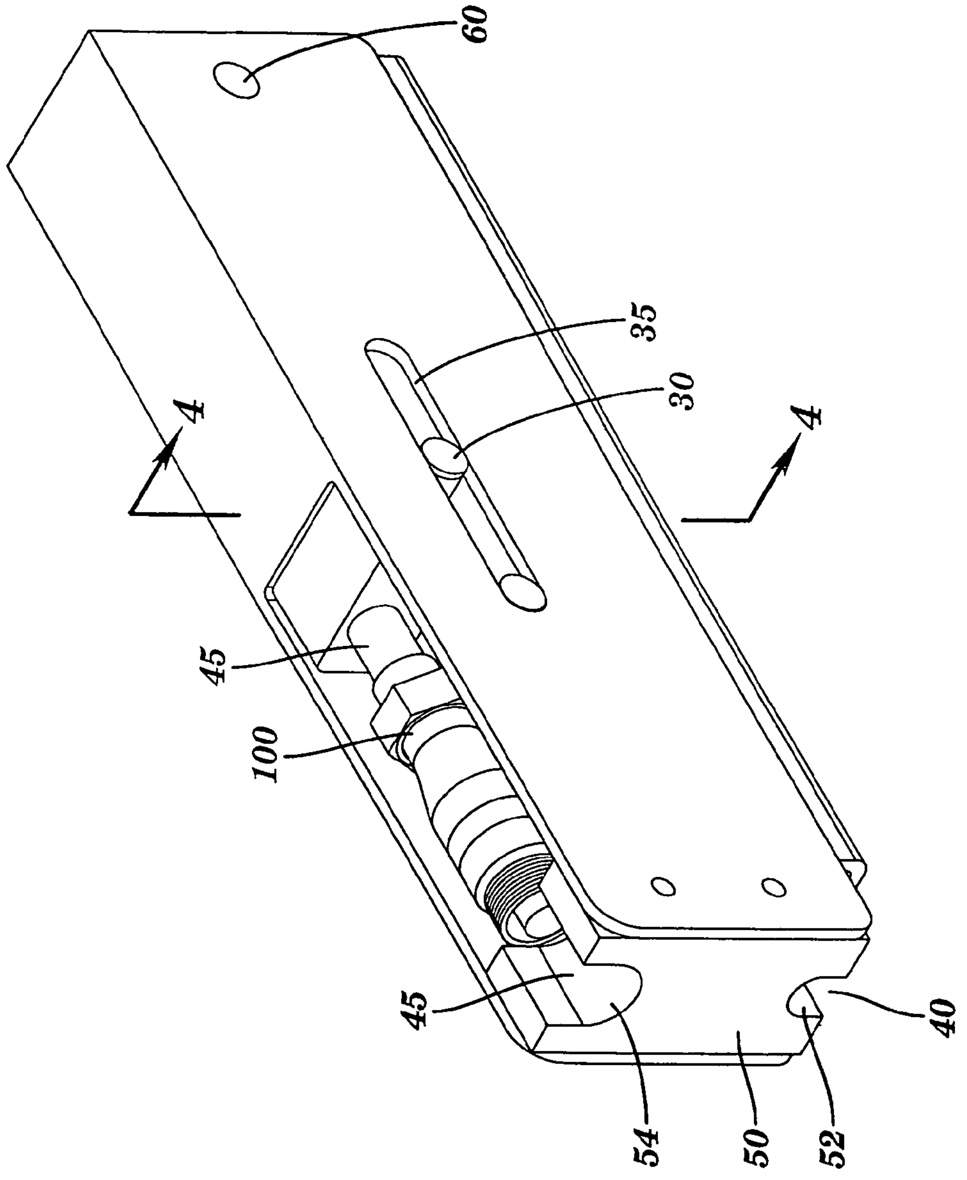
FIG. 3 displays a cross-sectional side perspective view of the tool with connector end.

In FIG. 3 a protruding component 30 may be affixed to the sliding head 25 and configured to be operatively coupled either directly or indirectly such as linkage 70 with the handle 15. The protruding component 30 works in conjunction with a receiving portion 35 that is positioned within at least one side of the body 10. The receiving portion accepts the protruding component 30 of the head 25 to secure the sliding head 25 to the body. The linkage portion 70 moves the protruding component 30 within the receiving portion 35 so that the sliding head 25 moves toward the cable cradle 50 compressing the cable connector onto the wire. A hinge 60 pivotally affixes the handle 15 to the body 10. The linkage portion 70 can be a rod, screw, piston, hydraulics, electrical motor, air piston, or any other force generating and/or transferring device suitable for inclusion.

FIG. 4 displays a first compressed length 65 that corresponds to the upper compression channel portion 40 of the head 25 and a second compressed length 66 that corresponds to the lower compression channel portion 45 of the head. The compressed lengths 65, 66 are controlled by the dimensions of the specific connector. The connector dimensions are designed into and controlled by the sliding head 25 and the receiving portion 35. The sliding head 25 is limited from further travel beyond the desired connector compressed length 65, 66. To further control the movement of the sliding head 25 a stop can be part of the receiving portion 35. The toggle lever 70 also may be stopped by a toggle contact 72 on the sliding head 25 that may block further travel of the handle 15 as an additional optional feature.

FIG. 4 also displays a first driver tip 80 for the upper compression channel portion 40 of the sliding head 25 for receiving the connector of the first dimension. The driver tip 80, which is a hollow tube, pipe, conduit, rod or any other device with a hole or spacing device to both protect the connector center electrode or post and to transmit the compression force from the sliding head 25 to the connector. The embodiment may also includes at least one additional driver tip or a second driver tip 82 for the lower compression channel portion 45 of the sliding head 25 for receiving the connector of the second dimension. The driver tips are received by the sliding head 25 by driver tip receivers 81, 83 to center and guide the driver tip or are formed integrally into the sliding head 25 itself. The driver tips 80, 82 that can be of the same or different diameters and lengths transmit the force from the sliding head 25 onto the connector to compress the connector onto the wire. The driver tips 80, 82 may alternatively be incrementally or infinitely adjustable by expanding and/or contracting the length of the driver tips 80, 82 through devices that would telescope or notches, pegs, ratchets or the like. The driver tips 80, 82 may be integral or separate parts.

FIGS. 1-6 display an embodiment of the multiple connector size compression tool 100 that can be made out of a metal, rigid plastic or similarly performing material that comprise a body 10 having a top 11, a bottom 12, a first side 13 and a second side 14 each side having a guidance portion 35 therein that can act to both control the direction and length of the stroke of the tool 100. This tool 100 may be made in a form designed to portably fit within the grasp of a users single hand, but if desired by the user, three, four, five or more connectors compression channels can be designed to be present in the tool 100. The tool 100 could be either permanently or removably affixed to a user's workstation, desk, or other stationary or semi-stationary fixture.

The tool 100 has a handle 15, wherein the handle 15 may be pivotally attached to the body 10 to either the first side 13, the second side 14 or to both sides and the handle 15 is attached to an linkage element 70 that actuates sliding head 25. The optional linkage element 70 may aid in the speed of reloading the tool with an uncompressed connector because the sliding head retracts creating a larger compression chamber when the handle 15 is raised. The linkage 70 is any force transferring or generating device such as a rod, gear, pistons either hydraulic or pneumatic amongst other commonly know elements as discussed herein. The connectors are compressed onto the desired wire of the appropriate length by a sliding head 25 having an affixed protruding component 30, wherein the protruding component 30 of the sliding head 25 may be both retained and movable within the guidance portion 35 of the body 10. The guidance portion 35 can either be a groove, a valley formed between two raised surfaces or just a trough of sufficient depth to receive the guidance portion 35 or other similar features. The protruding component 30 can be anything that may operate with the guidance portion 35. When the protruding component 30 is a post it can be used to assemble and retain the sliding head 25 within the body 10 by passing the post through the guidance portion 35 of the body 10 into the head 25 to be moveably affixed. The sliding head 25 can also alternatively be guided by the body if the walls of the body were assembled around the sliding head during production so that after assembly the only path for movement of the sliding head 25 would be linear and the linkage 90 would control the length of travel.

FIG. 4 displays a toggle lever 70 that is a linkage that is operable with the handle 15 that may work in conjunction with a portion of the body 10 and the sliding head 25 may be used to limit the travel of the handle 15 to prevent over-compression and crushing of the connector. This feature of the toggle lever 70 and a toggle contact 72 on the sliding head 25 may be used in conjunction with the guidance portion 35 of the body 10 to limit the travel to a certain desired point. The guidance portion 35 could also be placed on the sliding head 25 and the protruding component 30 could be affixed to either the handle 15 or the body 10 in an alternative method such as a bar, catch, coupling, dowel, fastener, key, lag, latch, peg, pin, rivet, rod, screw, skewer, sliding bar, spike, staple, or stud.

To compress the connector, the body 10 forms an upper compression channel portion 40 configured to receive a connector of a first dimension and at least one lower compression channel portion 45 configured to receive a connector of a second dimension typically different than the first dimension. The sliding head 25 is driven toward a cable cradle 50 having an upper cable receiving portion 52 and a lower cable receiving portion 54, wherein the cradle may be affixed to the body 10 between the first side 13 and the second side 14.

The handle 15 may also alternatively with an angled portion 20 contact a portion of the sliding head 25 to move the sliding head 25 from uncompressed to compressed positions or the handle 15 may use the mechanical advantage of the linkage element 70 to move the handle 15 from an uncompressed (FIGS. 5 and 6) to compressed position (FIG. 1-4). The contact between the guide portion and the protruding component 30 is a surface to surface contact, but optionally a bearing 32 can be disposed over the protruding component 30 such as a post of the sliding head 25. The bearing 32 would reduce the friction and wear between the two surfaces and provide for smoother movements when moving in conjunction with the guidance portion 35 that may be a groove.

The connector may be pressed on by a driver trip 80, 82 that can be permanently affixed within the sliding head 25 or removable for replacement due to wear. The type of connector that can be compressed may be defined by a first compressed length 65 and/or diameter that corresponds to the upper compression channel portion 40 of the head. The second compressed length 66 and/or diameter that corresponds to the lower compression channel portion 45 of the head 25 may facilitate multiple connectors to be compressed by the same tool without the use of adapters.

A method of affixing a cable connector to a wire comprises providing a body 10 having a top 11, a handle 15 that may be coupled to a linkage or toggle lever 70, wherein the handle 15 is attached to the top 11 of the body 10. This body 10 is configured to have the capacity to produce at least two different dimensioned connectors. The body 10 houses a sliding head 25 having a protruding component 32 that is slidably affixed to the body 10 and in contact with the angled portion 20 of the handle 15, to allow movement of the sliding head 25. The sliding head 25 and body 10 form an upper compression portion 40 of the sliding head 25 for receiving a connector of a first dimension, a lower compression portion 45 of the sliding head for receiving a connector of a second dimension larger than the first dimension, and a cable cradle 50 affixed to the body 10. It should be understood that although a cradle 50 is depicted other shapes and devices may be within the purview of the present invention such as a fastener, catch, clasp, grip, lock, snap, vice, clamp, hole, guide, opening, aperture, cavity, chamber, cleft, cut, dent, depression, dimple, dip, gap, keyhole, lacuna, notch, orifice, outlet, or passage. The importance of the cradle 50 is for the purpose of holding or guiding the cable or wire during assembly of the connector. Once the correct tool is provided the next step is providing a cable connector and a wire start by inserting the cable connector and the wire onto an appropriately sized driver tip in the body 10. After inserting the uncompressed cable the next step is moving the sliding head 25 to drive the cable connector onto the wire forming a connector cable by means of either a handle or other means of mechanical leverage before removing the connector cable from the body.

The tool 100 can compress, attach or affix two or more different sized connectors individually, consecutively or simultaneously compress and produce two cables by providing a second, third, fourth, etc. cable connector and a second, third, or fourth, etc. wire and then inserting the second cable connector and second the wire onto an appropriately sized driver tip in the body before compressing the handle. Therefore embodiments of the present invention allow for either faster production or the option of producing two different sized connectors without using an adapter.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

I claim:

1. A multiple connector compression tool for use with multiple sized connectors and a cable, said compression tool comprising:

a body having an upper portion, a lower portion, a first side and a second side;

an actuator, wherein the actuator is movably attached to the upper portion of the body;

a first compression chamber that is operatively coupled and positioned proximate to the actuator, and configured for receiving a first cable connector of a first dimension;

a second compression chamber that is operatively coupled and positioned distal to the actuator, and configured for receiving a second cable connector of a second dimension, said second cable connector being a different dimension than the first cable connector; and a first cable receiving portion, operably associated with the first compression chamber, wherein when a coaxial cable is positioned in the first cable receiving portion, a connector of a first dimension may be compressed thereon by force from the actuator; and a second cable receiving portion, operably associated with the second compression chamber, wherein when a coaxial cable is positioned in the second cable receiving portion, a connector of a first dimension may be compressed thereon by force from the actuator.

2. The tool of claim 1, wherein the actuator is a handle and further comprising:

a sliding head having a protruding component, wherein the protruding component of the sliding head may be both retained and movable within the body, wherein the protruding component extends from the sliding head and is configured to contact with the handle; and a receiving portion within at least one side wall of the body that accepts the protruding component extending from the head.

3. The tool of claim 2 further comprising:

a toggle lever affixing the sliding head to the handle.

4. The tool of claim 1 further comprising:

a first compressed length that corresponds to the upper compression channel portion of the head.

5. The tool of claim 1 further comprising:

a second compressed length that corresponds to the lower compression channel portion of the head.

6. The tool of claim 1 further comprising:

a toggle lever affixed to the actuator; and a sliding head operably coupled to the toggle lever and dimensioned to form a portion of the first compression chamber and the second compression chamber.

7. The tool of claim 1 further comprising:

a sliding head; and a guide on the body for the sliding head that blocks further travel.

8. The tool of claim 1 further comprising:

a first driver tip for the upper compression channel portion of the sliding head for receiving the connector of the first dimension.

9. The tool of claim 1 further comprising:

a second driver tip for the lower compression channel portion of the sliding head for receiving the connector of the second dimension.

10. A multiple connector size compression tool comprising:

a body having a top, a bottom, a first side and a second side each side having a guidance portion therein;

a handle, wherein the handle is pivotally attached to the body between the first side and the second side;

a transfer element;

a sliding head having a protruding component, wherein the protruding component of the sliding head is both retained and movable within the guidance portion of the body and the transfer element transmits force from the handle to the sliding head;

an upper compression channel portion configured to receive a connector of a first dimension;

a lower compression channel portion configured to receive a connector of a second dimension different than the first dimension; and a cable cradle having an upper cable receiving portion and a lower cable receiving portion, wherein the cradle is affixed to the body between the first side and the second side.

11. The tool of claim 10 further comprising:

a bearing disposed over the protruding component of the sliding head.

12. The tool of claim 10 wherein the guidance portion is a groove.

13. The tool of claim 10 wherein a driver trip is permanently affixed within the sliding head.

14. The tool of claim 10 further comprising:

a first compressed length that corresponds to the upper compression channel portion of the head.

15. The tool of claim 10 further comprising:

a second compressed length that corresponds to the lower compression channel portion of the head.

16. The tool of claim 10 wherein the protruding component on the sliding head is a post.

17. The tool of claim 10 wherein the guidance portion on the body is a groove and the protruding component on the sliding head is a post dimensioned to fit movably within the groove.

* * * * *